March 25, 1969     I. N. HOOTON     3,435,197

TRIGONOMETRICAL FUNCTION GENERATORS

Filed Feb. 15, 1966     Sheet 1 of 2

United States Patent Office 3,435,197
Patented Mar. 25, 1969

3,435,197
TRIGONOMETRICAL FUNCTION GENERATORS
Ivor Noel Hooton, Cassington, England, assignor to United Kingdom Atomic Energy Authority, London, England
Filed Feb. 15, 1966, Ser. No. 527,613
Claims priority, application Great Britain, Mar. 10, 1965, 10,089/65
Int. Cl. G06g 7/22
U.S. Cl. 235—197     4 Claims

ABSTRACT OF THE DISCLOSURE

A trigonometrical function generator comprises a linear potentiometer having a movable contact supplied with an input current $i_0$ and arranged to be positioned to correspond with the value of an input angle $\theta$, at least one adding circuit, two further contacts on the potentiometer from at least one of which a current $i_1$ (bearing a relationship to $i_0$ dependent upon the position of the movable contact) is fed to the adding circuit. The generator further includes means for holding the other two contacts at the same potential, and means for supplying to the adding circuit a further current bearing a predetermined relationship with the potential difference between the movable contact and the other contacts, whereby when the current $i_1$ and the further current are added in the adding circuit, the output from the adding circuit is substantially proportional to $i_0 \sin \theta$ or $i_0 \cos \theta$.

---

This invention relates to trigonometrical function generators.

Throughout this specification the term "trigonometrical function generator" is used to mean an electric circuit which supplies an output electric current which is substantially proportional to the sine or cosine of an angle.

According to the present invention, a trigonometrical function generator comprises a linear potentiometer of resistance R the two ends of which are connected to the inputs of first and second current adding circuits respectively, the first and second adding circuits being such that the voltage at each end of the potentiometer is substantially the same, a movable contact on the potentiometer which is arranged to be positioned to correspond with the value of an input angle $\theta$ which lies in the range 0° to 90°, means to supply an input current $i_0$ to the movable contact whereby currents are supplied from the potentiometer to the inputs of the first and second adding circuits, and means to supply a current $V/kR$ to the inputs of each of the first and second adding circuits where V is the voltage between the movable contact and the input of the relevant adding circuit and k is a constant, the arrangement being such that the first and second adding circuits supply output currents $i_s$ and $i_c$ which are substantially equal to $i_0 \sin \theta$ and $i_0 \cos \theta$ respectively.

According to a feature of the present invention, a trigonometrical function generator of sine functions comprises a linear potentiometer of resistance R one end of which is connected to the input of a current adding circuit and the other end of which is maintained at substantially the same voltage as the first-mentioned end, a movable contact on the potentiometer which is arranged to be positioned to correspond with the value of an input angle $\theta$ which lies in the range 0° to 90°, means to supply an input current $i_0$ to the movable contact whereby a current is supplied from the potentiometer to the input of the adding circuit, and means to supply a current $V/kR$ to the input of the adding circuit where V is the voltage between the movable contact and the input of the adding circuit and k is a constant, the arrangement being such that the adding circuit supplies an output current $i_s$ which is substantially equal to $i_0 \sin \theta$.

According to another feature of the present invention, a trigonometrical function generator of cosine functions comprises a linear potentiometer of resistance R one end of which is connected to the input of a current adding circuit and the other end of which is maintained at substantially the same voltage as the first-mentioned end, a movable contact on the potentiometer which is arranged to be positioned to correspond with the value of an input angle $\theta$ which lies in the range 0° to 90°, means to supply an input current $i_0$ to the movable contact whereby a current is supplied from the potentiometer to the input of the adding circuit, and means to supply a current $V/kR$ to the input of the adding circuit where V is the voltage between the movable contact and the input of the adding circuit and k is a constant, the arrangement being such that the adding circuit supplies an output current $i_c$ which is substantially equal to $i_0 \cos \theta$.

Each of said adding circuits may comprise an earthed-based junction transistor.

A trigonometrical function generator in accordance with the present invention will now be described by way of example with reference to the accompanying drawings, in which.

Figure 1:
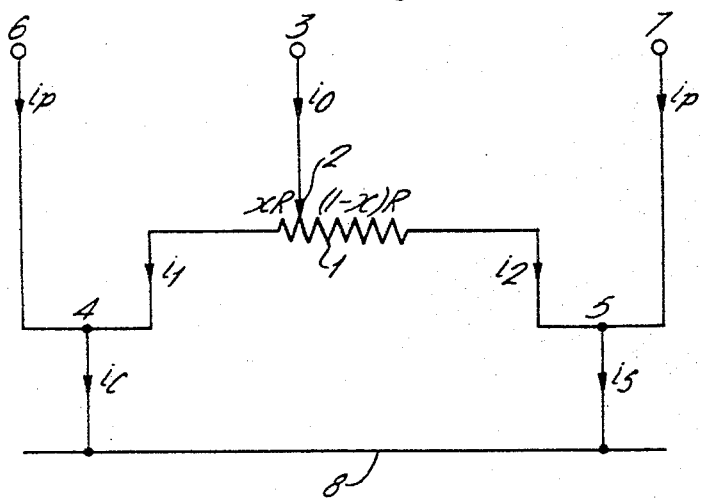
FIGURE 1 shows a diagrammatic representation of the function generator.

It is convenient first to consider the trigonometrical function generator theoretically, and this will be done with reference to FIGURE 1 of the drawings.

This shows a linear potentiometer 1 of total resistance R divided into two parts of resistance $xR$ and $(1-x)R$ by a movable contact 2. It is assumed that a current $i_0$ flows from a terminal 3 to the movable contact 2 and that currents $i_1$ and $i_2$ flow from the potentiometer 1 to junctions 4 and 5 respectively. It is also assumed that equal currents $i_p$ each equal to $V/kR$, where k is a constant, flow from terminals 6 and 7 to the junctions 4 and 5 respectively, and that the junctions 4 and 5 are connected by way of very low impedances to points of equal potential (the line 8), so that the currents supplied to the junctions 4 and 5 are in effect added by low-impedance current adding circuits. The currents flowing from the junctions 4 and 5 to the line 8 are designated $i_c$ and $i_s$, whilst V is the potential difference between the movable contact 2 and the line 8, that is between the movable contact 2 and the junction 4 or 5.

It is evident that when the movable contact 2 is at the extreme end of the potentiometer 1 nearer the junction 4

$$i_c = i_0 = i_0 \cos 0°$$

and $$i_s = 0 = i_0 \sin 0°$$

whilst when the movable contact 2 is at the extreme end of the potentiometer 1 nearer the junction 5

$$i_c = 0 = i_0 \cos 90°$$

and $$i_s = i_0 = i_0 \sin 90°$$

so that if the control of the movable contact 2 is scaled for angles ($\theta$) from 0° to 90° then currents ($i_s$ and $i_c$) proportional to the sines and cosines of 0° and 90° at least are accurately generated.

Considering now the case where the movable contact 2 is at some intermediate point on the potentiometer 1, we have:

$$V = i_1 \times R = i_2(1-x)R = i_0 x(1-x)R$$

Therefore:

$$i_1 = (1-x)i_0 \text{ and } i_2 = xi_0$$

Again:

$$i_p = V/kR = x(1-x)i_0/k$$

Hence:

$$i_c = i_1 + i_p = i_0(1 - x + x/k - x^2/k) \quad (1)$$

and:

$$i_s = i_2 + i_p = i_0(x + x/k - x^2/k) \quad (2)$$

To make the function generator accurate at 45°, that is when the movable contact 2 is at the mid-point of the potentiometer 1 and $x = \frac{1}{2}$, we must have:

$$i_c = i_0 \cos 45° = i_0/\sqrt{2}$$

Which, using Equation 1, gives:

$$k = \frac{1}{2}(\sqrt{2} - 1)$$

The same value for $k$ is obtained starting from:

$$i_s = i_0 \sin 45° = i_0/\sqrt{2}$$

and using Equation 2.

Figure 2:
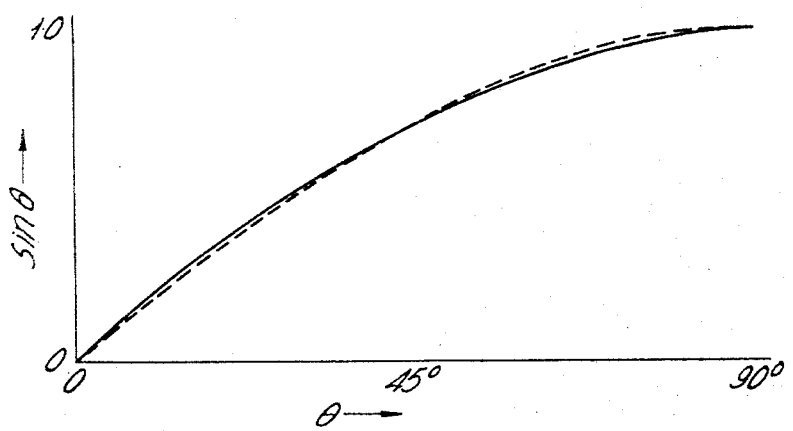
FIGURE 2 shows graphically outputs from the function generator.

Using this value of $k$ therefore the sine and cosine of 45° are also accurately generated. The values that will be obtained for the sines and cosines of other values of the angle $\theta$ within the range 0° to 90° can then be found by calculation from Equation 1 or 2. The calculated values for sines are represented by the full curve of FIGURE 2 of the drawings, in which the angle is plotted as abscissae and $\sin \theta$ is plotted as ordinates. The broken curve represents the true values of $\sin \theta$. It is seen that the accuracy is good over the whole range. A similar accuracy is obtained for $\cos \theta$.

As a consequence of calculating the value of $k$ at 45°, particular accuracy is obtained for values of the angle in the vicinity of 45°. If however particular accuracy is required elsewhere in the range, $k$ can be calculated at some other value.

Figure 3:
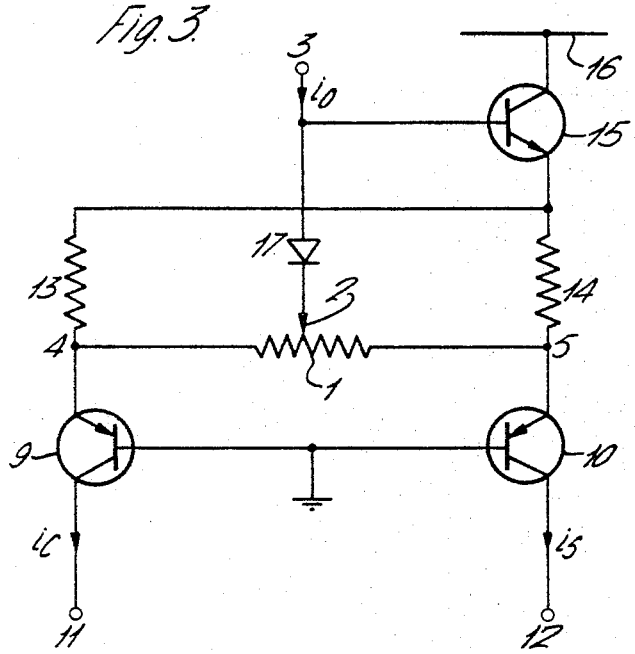
FIGURE 3 shows the circuit of the function generator.

An actual trigonometrical function generator will now be described with reference to FIGURE 3 of the drawings. Similar reference numerals are used where possible.

The input terminal 3 is connected to the movable contact 2 of the linear potentiometer 1, the two ends of which are connected to the emitter electrodes of junction transistors 9 and 10, respectively, the collector electrodes of which are connected to output terminals 11 and 12, respectively. The base electrodes of the transistors 9 and 10 are earthed, so that the transistors 9 and 10 form the desired low-impedance current adding circuits.

The junctions 4 and 5 are connected by way of equal resistors 13 and 14, respectively, to the emitter electrode of a junction transistor 15, the collector electrode of which is connected to a supply line 16. The base electrode of the transistor 15 is connected to the input terminal 3, and to compensate for the voltage drop across the base/emitter junction of the transistor 15, a semiconductor junction diode 17 is connected between the input terminal 3 and the movable contact 2.

The values of the resistors 13 and 14 are determined relative to the resistance R of the potentiometer 1 as described above.

When during operation an input current $i_0$ is supplied to the input terminal 3, currents $i_c$ and $i_s$ may be derived from output terminals 11 and 12, respectively, where:

$$i_c = i_0 \cos \theta$$

and:

$$i_s = i_0 \sin \theta$$

$\theta$ being the angle corresponding to the position of the movable contact 2.

Some inaccuracy occurs near the ends of the range because the emitter potentials of the transistors 9 and 10 are not wholly independent of the current when the current flowing in the transistor 9 or 10 is small. These inaccuracies can be very considerably reduced by connecting constant current sources to the emitter electrodes of the transistors 9 and 10 so that the current flowing in each of the transistors 9 and 10 is increased, by I say, throughout the range. These currents I are then subtracted from the currents supplied to the output terminals 11 and 12.

Clearly if it is desired to generate only sine or cosine functions a single-ended arrangement can be used in which the unwanted adding circuit is omitted. In this case the free end of the potentiometer 1 must be returned to the same voltage as the end which is connected to the adding circuit.

The function generator may for example form part of a circuit arrangement which derives the signals required for a multi-dimensional cathode ray tube display, or be used in analogue computation.

Figure 4:
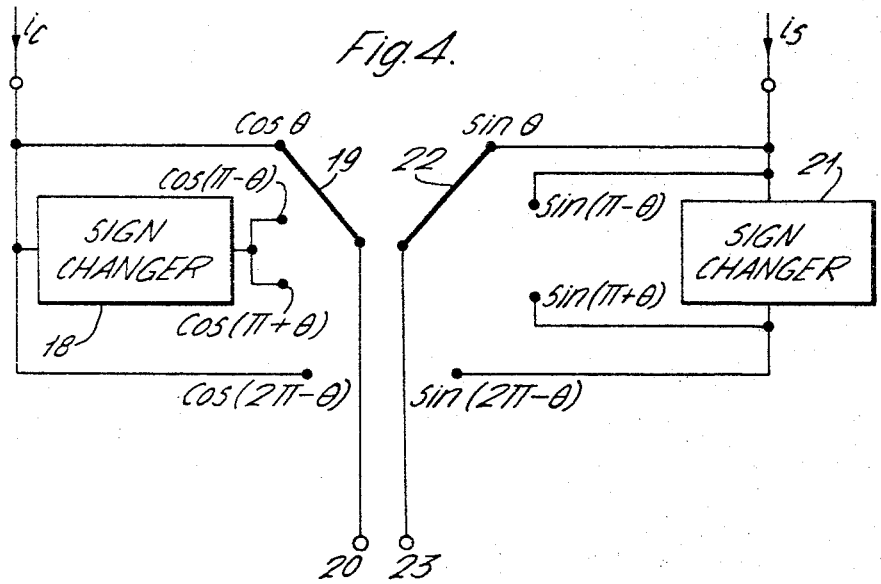
FIGURE 4 shows an additional circuit which may be used with the function generator.

As described the function generator covers the range from 0° to 90°, that is values of $\theta$ in one quadrant only. To cover the remaining quadrants a switching circuit must be added to the trigonometrical function generator. A suitable switching circuit is shown in FIGURE 4 of the drawings, to which reference is now made.

The output terminal 11 is connected to the switch contacts marked $\cos \theta$ and $\cos (2\pi - \theta)$, and via a sign changer 18, to the switch contacts marked $\cos (\pi - \theta)$ and $\cos (\pi + \theta)$. The switch 19 enables a terminal 20 to be connected to any desired one of these contacts.

The output terminal 12 is connected to the switch contacts marked $\sin \theta$ and $\sin (\pi - \theta)$ and, via a sign changer 21, to the switch contacts marked $\sin (\pi + \theta)$ and $\sin (2\pi - \theta)$. The switch 22 enables a terminal 23 to be connected to any desired one of these contacts.

The control for the movable contact 2 (FIGURE 3) is calibrated in values of $\theta$ from 0° to 90°, and to obtain sines of angles in this quadrant the switch 22 is set to the contact marked $\sin \theta$. For values of $\theta$ increasing towards 90° the contact 2 (FIGURE 3) will be advanced towards a position corresponding to one end of the potentiometer 1. On reaching 90° the switch 22 is set to the contact marked $\sin (\pi - \theta)$. As $\theta$ increases past 90° therefore the contact 2 (FIGURE 3) will be moved back towards a position corresponding to the other end of the potentiometer 1, and so on up to 360°. Clearly it is convenient to arrange that the contact 2 (FIGURE 3) has two scales, associated respectively with the switches 19 and 22, each scale having four different aspects corresponding to the four quandrants and changing automatically when the appropriate switch 19 or 22 is changed.

With this arrangement the values of sines and cosines in any quadrant can be obtained.

I claim:

1. A trigonometrical function generator comprising a linear potentiometer having a movable contact arranged to be positioned to correspond with the value of an input angle $\theta$, means for supplying an input current $i_0$ to the movable contact, at least one adding circuit, two further contacts on the potentiometer from at least one of which further contacts a current $i_1$, which bears a relation to $i_0$ dependent upon the position of the movable contact, is fed to the adding circuit, means for holding the said two further contacts at the same potential, means for supplying to the adding circuit a further current bearing a predetermined relationship with the electrical potential difference V between the movable contact and the said further contacts, whereby when the current $i_1$ and the said further current are added in the adding circuit, the output from the adding circuit is substantially proportional to $i_0 \sin \theta$ or $i_0 \cos \theta$.

2. A trigonometrical function generator as claimed in claim 1, wherein there are first and second adding circuits, to the inputs of which the two further contacts are respectively connected whereby currents $i_1$ and $i_2$ respectively are fed to the first and second adding circuits, the means for supplying further current supplying to each adding circuit a further current $V/kR$ where R is the resistance of the potentiometer between the two further contacts, the outputs of the addding circuits thereby being substantially proportional to $i_0 \sin \theta$ and $i_0 \cos \theta$ respectively.

3. A trigonometrical function generator as claimed in claim 1, wherein the adding circuit comprises an earthed-base junction transistor.

4. A trigonometrical function generator as claimed in claim 1, wherein the range of movement of the movable contact corresponds to input angles $\theta$ in the range 0 to 90° and a sign switching arrangement is provided to enable output currents to be derived corresponding to values of the input angle $\theta$ lying in other quadrants, additional to the quadrant 0 to 90°.

References Cited

UNITED STATES PATENTS

| | | | |
|---|---|---|---|
| 2,852,191 | 9/1958 | Lazarus | 235—191 |
| 2,947,481 | 8/1960 | Vance | 235—186 |
| 2,983,448 | 5/1961 | Gray | 235—186 |
| 3,090,908 | 5/1963 | Mynall | 235—186 X |
| 3,230,359 | 1/1966 | Gray | 235—183 |
| 3,264,553 | 8/1966 | Nathan | 235—197 X |

MALCOLM A. MORRISON, *Primary Examiner.*

R. W. WEIG, *Assistant Examiner.*

U.S. Cl. X.R.

235—186